Figure 1:
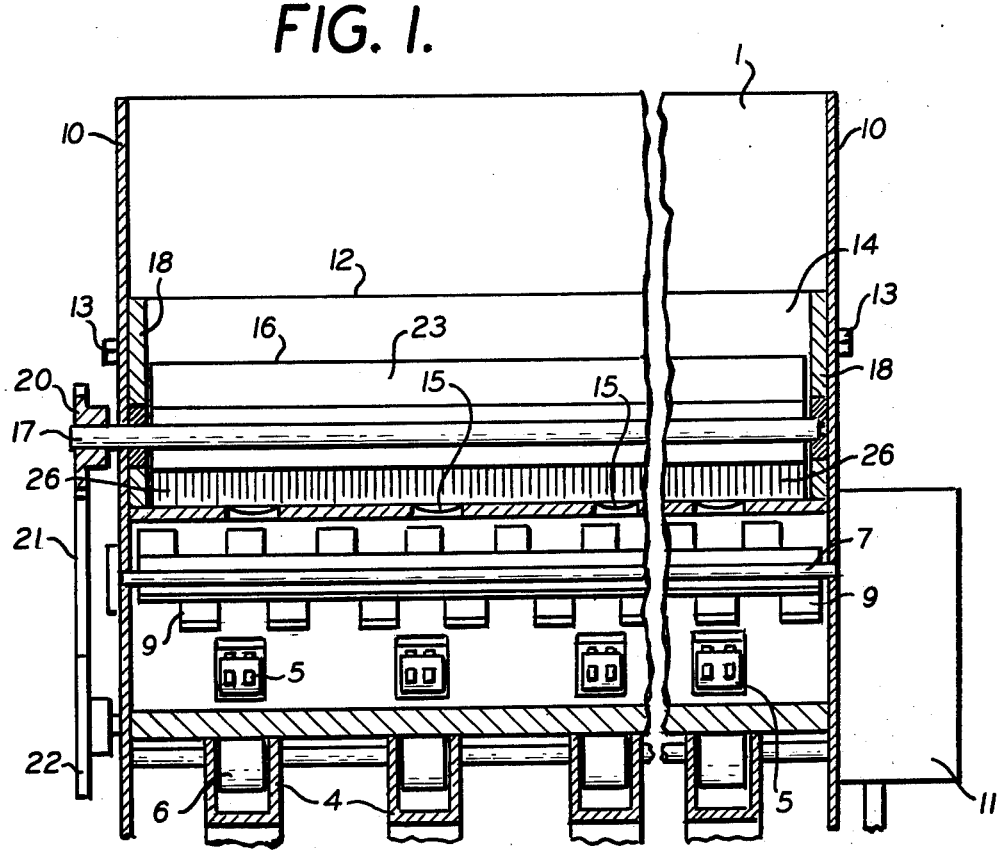

United States Patent [19]

Grosse-Scharmann et al.

[11] 4,037,759
[45] July 26, 1977

[54] SEED PLANTING MACHINE

[75] Inventors: Franz Grosse-Scharmann; Bernd Gattermann; Bernhard Steenken, all of Oldenburg, Germany

[73] Assignee: Amazonen-Werke H. Dreyer, Hasbergen-Gaste, Germany

[21] Appl. No.: 643,049

[22] Filed: Dec. 22, 1975

[30] Foreign Application Priority Data

Dec. 21, 1974  Germany .............................. 2460869

[51] Int. Cl.² .............................................. B67D 5/56
[52] U.S. Cl. ................................... 222/142; 222/238; 222/190
[58] Field of Search ........................... 221/135, 93, 96; 222/142, 190, 227, 238, 406, 407

[56] References Cited

U.S. PATENT DOCUMENTS

| 728,492 | 5/1903 | Norris | 222/238 X |
| 1,645,935 | 10/1927 | Schei | 222/238 |
| 3,601,289 | 8/1971 | Gustafson | 222/238 |
| 3,667,654 | 6/1972 | Holley | 222/407 |

Primary Examiner—Stanley H. Tollberg
Attorney, Agent, or Firm—Burgess, Dinklage & Sprung

[57] ABSTRACT

A planting machine having a driven agitator mechanism (7) in the seed hopper (10) which has outlet openings (3) for the seeds, is provided with a magazine (12) disposed over the agitator mechanism (7) for holding seed disinfectant. The magazine (12) has outlet openings (15) and is equipped with a stirring mechanism (16).

24 Claims, 8 Drawing Figures

SEED PLANTING MACHINE

BACKGROUND

The invention relates to a planting machine having a driven planting mechanism as well as a seed hopper provided with outlet openings, in which a driven stirring mechanism is disposed above the outlet openings.

In planting machines of this kind it has long been found disadvantageous that the disinfection or dusting of the seed against pests of all kinds, which is necessary before planting it, must be performed in a separate and time-consuming operation. German Offenlegungsschrift No. 2,036,760 has disclosed a planting machine of the above described type of construction in which an attempt is made to remedy this inconvenience by disposing in the hopper of the machine, above the stirring mechanism, a mixing system which is equipped with elongated projecting members and is driven during the planting operation. This system, however, has the disadvantage that, in the first filling of the hopper, previously disinfected or dusted seed must still be loaded into it, because the action of the mixing system does not reach the bottom part of the seed hopper. Furthermore, when the hopper is refilled, the required amount of the disinfectant must be sprinkled and uniformly distributed over a relatively thin layer of seed so as to enable the mixing system to act upon and thoroughly mix the seed and disinfectant. This procedure however, appreciably delays the refilling operation. Finally, it is disadvantageous that care must be taken when using the machine to see that the level of the seed in the hopper does not drop below the mixing system, and consequently substantially more frequent stopping for refilling is required than would be the case if the hopper could be at least approximately emptied each time.

THE INVENTION

The invention is addressed to the problem of achieving a uniform disinfection or dusting of the seed contained in the hopper of the planting machine while the machine is in operation, while at the same time avoiding the disadvantages described above.

This problem is solved by the invention in that a disinfectant distributor is to be disposed above the stirring mechanism and is to contain a magazine provided only for the disinfectants or dusts, as well as disinfectant feeding members which, while the planter is in operation, are driven relatively to the said magazine.

As a result of these measures it is possible to charge the disinfectants or dusts into the disinfectant distributor prior to the first filling of the seed hopper of the machine with seeds, and independently thereof. Therefore, there is no delay involved either in the loading of the seeds or in the loading of the disinfectants or dusts. Since, furthermore, the disinfectants or dusts trickle in small amounts from the disinfectant distributor while the machine is standing still, the seeds falling into the bottom part of the hopper as the latter is being loaded therewith become adequately disinfected or dusted. After the machine is started up, the seeds moving down into the lower portion of the hopper become sprinkled with the substance being distributed from the disinfectant distributor and become thoroughly mixed by the action of the agitating mechanism. Not only is perfect disinfection or dusting assured in this manner, but also no extra delay is involved in loading the hopper with seed. Since furthermore the disinfectant or dust needs to be added to the seed in no more than extremely small amounts, a single filling of the disinfectant distributor will suffice in most cases for the planting of a field of relatively large area.

The invention furthermore provides that the disinfectant distributor will extend at least approximately over the entire area of the outlet openings in the hopper of the machine. This permits a still more frequent contact of the disinfectant or dust with the seeds, thereby providing still further safety in the precise disinfection or dusting in accordance with the provisions of the law.

In accordance with the invention, the disinfectant distributor is to be mounted fixedly but removably within the hopper of the machine. This permits a simple method of mounting the disinfectant distributor on the planter and also enables the distributor to be adapted to planters of different types of construction. If, in this case, the disinfectant feeding means of the distributor are driven feeding means whose drive mechanism can be coupled with the seed planting mechanism of the machine, a certain fixed drive ratio will exist between the seed planting mechanism and the disinfectant feeding means of the disinfectant distributor. This eliminates the need for any special adjustment of the disinfectant distributor, because in the case of large seed outputs in the same ratio, a correspondingly great amount of the disinfectants or dusts is delivered from the disinfectant distributor to the seed.

It is furthermore provided, in accordance with the invention, that the disinfectant feeding means of the disinfectant distributor are disposed within the disinfectant magazine and consist of a shaft and plates of resilient material fastened thereon, that the disinfectant magazine has a rounded cross section in its bottom portion where the outlet openings are located, and that the distance of the outlet openings from the shaft is less than the reach of the plates from the shaft. In special circumstances, such as high atmospheric humidity for example, these measures make possible the perfect feeding of the disinfectants or dusts from the disinfectant distributor, since the plates uniformly push the substances through the outlet openings. In addition, the plates, after passing through the rounded bottom portion of the disinfectant magazine, snap upwardly, thereby imparting an additional movement to the substance within the magazine and keeping it in a loose condition.

If in this case resilient bristles are disposed on the shaft so as to follow immediately behind the plates as they are rotated, the above-described action will be intensified. At the same time the outlet openings will always be kept clear, i.e., the caking of the substances on the margins of these openings will be prevented. The outlet openings can be kept clear also by reducing the thickness of the wall of the disinfectant magazine in the area of the outlet openings and by making the wall thickness taper towards said outlet openings. Measures whereby the plates are divided into the individual paddles and the paddles passing over the outlet openings are provided with slits in the direction of the shaft also contribute toward this effect. Also by giving the outlet openings a shape that is elongated lengthwise of the shaft, a trouble-free delivery of the disinfectant or powder from the magazine can be achieved simultaneously with a broader delivery of the disinfectant or dust to the seed.

In one special embodiment, the invention provides that the outlet openings are in the form of slits between one portion of the wall of the disinfectant magazine and another portion thereof which is offset from the first portion. In this embodiment the pushing action of the paddles or bristles on the disinfectants or dusts in the area of the outlet openings is intensified.

In another embodiment of the invention the feeding means of the disinfectant distributor are provided within the disinfectant magazine, and consist of a shaft as well as arms attached thereto above the outlet openings and bearing scrapers, the disinfectant magazine having a rounded cross section in its bottom section containing the outlet openings, and the scrapers extending at an angle to the longitudinal axis of the shaft over the outlet openings. These measures, too, permit a trouble-free delivery of the disinfectants and dusts from the magazine.

A solution of the problem to which the invention is addressed is achieved also by equipping the magazine of the disinfectant distributor with a plurality of outlet openings distributed over its circumference and rotating it while the disinfectant feeding means contained within it are mounted fixedly with respect to the planting machine.

In another embodiment of the machine, provision is made for the disinfectant magazine of the disinfectant distributor to have a plurality of outlet openings distributed around its circumference and to be driven with a rotatory movement, and for a large number of small, solid bodies to be contained in the magazine as feeding means, the diameter of these bodies being larger than the width of the outlet openings. This design permits an especially simple and sturdy construction of the disinfectant distributor. In this case the loosely contained bodies serve to keep the disinfectants or dusts loose and to deliver them reliably through the outlet openings.

If in this case the outlet openings are offset from one another lengthwise of the disinfectant magazine, a uniform distribution of the disinfectants and dusts into the seeds is accomplished over the entire width and length of the hopper of the machine, directly upon the emergence of these substances from the magazine.

The invention furthermore provides that the agitator mechanism has a shaft equipped in a known manner with fingers, these fingers being made of resilient material. As a result of these measures a frequent, intensive contact of the disinfectants and dusts with the individual seeds is brought about, and hence an optimum disinfectant or dusting of the seeds. If, in accordance with the invention, the fingers are longer than the distance between the agitator shaft and the front and rear longitudinal walls of the hopper, the additional advantage is achieved that, up to the end of each hopper charge, the seeds will flow uniformly, in the desired and preset amount, from the hopper of the drill, and only very small amounts of seed will be left in the hopper.

Figure 2:
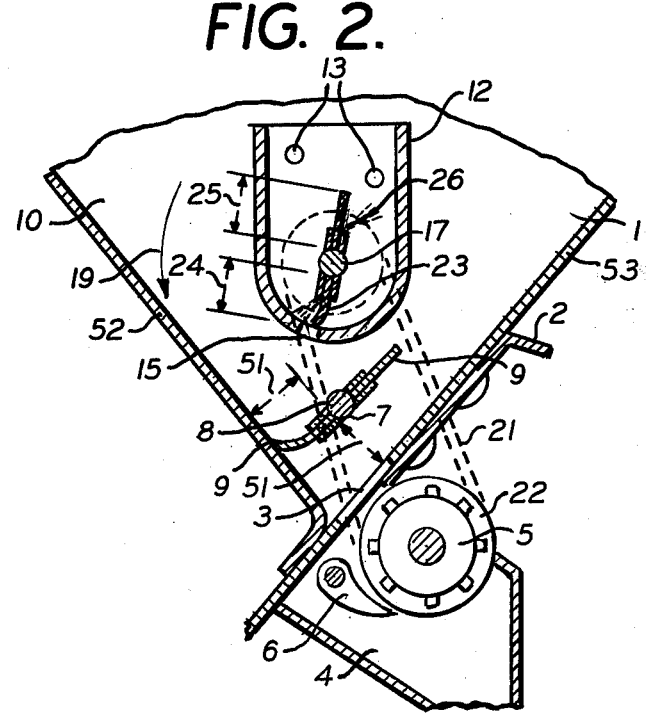
Figure 3:
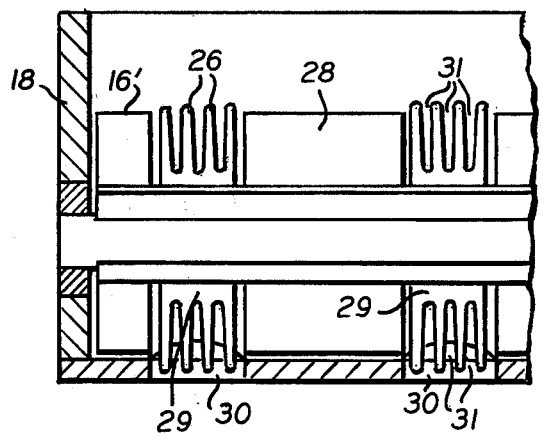
Figure 4:
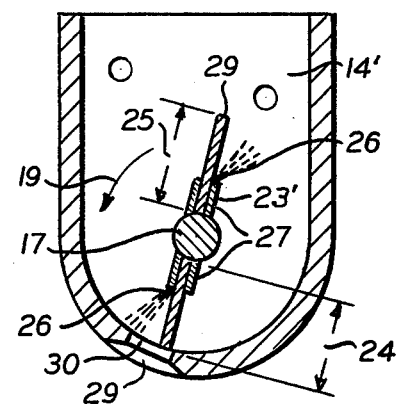
Figure 5:
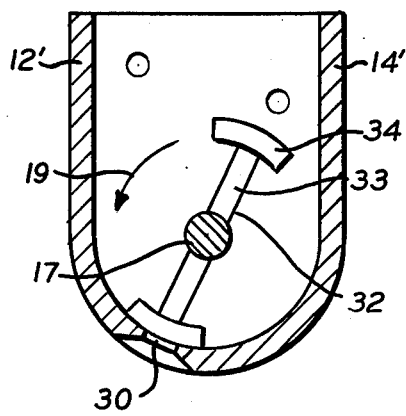
Figure 6:
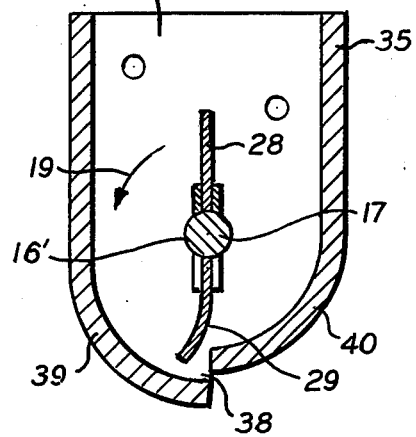
Figure 7:
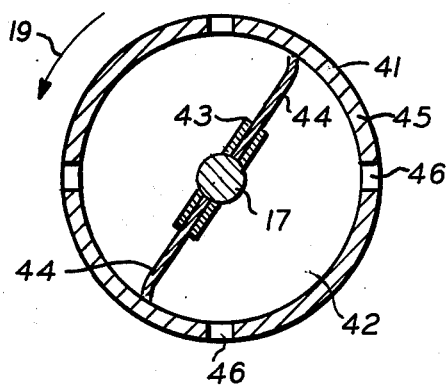
Figure 8:
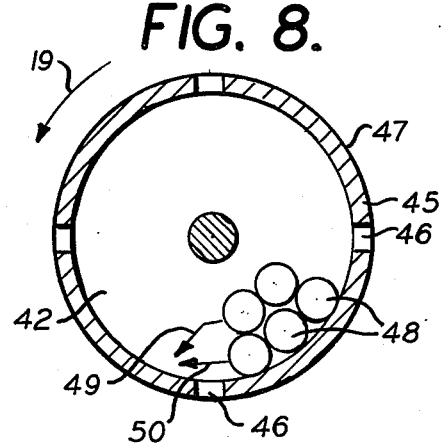

The invention will be further explained below with the aid of the examples of its embodiment represented in the appended drawings, wherein FIG. 1 is a longitudinal cross-sectional view of the upper portion of the planting machine of the invention, FIG. 2 is a cross-sectional view of the upper portion of the same machine, FIG. 3 represents, on a larger scale and in longitudinal cross section another construction of the disinfectant distributor of the same machine, FIG. 4 represents a cross-sectional view of the disinfectant distributor of FIG. 3, FIG. 5 is a cross-sectional view of another construction of the disinfectant distributor, FIG. 6 is a cross-sectional view of another construction of the disinfectant distributor, FIG. 7 is a cross-sectional view of a construction of the disinfectant distributor in which the disinfectant magazine is rotatable, and FIG. 8 is a cross-sectional view of another construction of a disinfectant distributor with a rotating disinfectant magazine.

The planting machine of a generally known type of construction, which for the sake of simplicity is not shown in its entirety in the drawing, has a seed hopper 1. In the bottom portion of this hopper, outlet openings 3 are disposed, which are adjustable to various sizes as well as closable by means of the shutter 2. On the outside of the seed hopper 1, in front of the outlet openings 3, are fastened the seeder boxes 4 containing the seed feeding mechanisms in the form of the notched seed wheels 5. Also, the bottom regulators 6, which are pivoted and can be locked in several positions, are located in the seeder boxes 4 underneath the seed wheels 5.

Within the hopper 1 and above the outlet openings 3 is located the agitator mechanism 7 which consists of the agitator shaft 8 and the resilient agitator fingers 9 fastened thereon, the agitator shaft 8 being mounted for rotation in the end walls 10 of the hopper 1. The seed wheels 5 and the agitator mechanism 7 are driven through the regulating drive 11 by the running gear of the planting machine, which is not shown.

Above the agitator mechanism is the disinfectant distributor 12, which is fastened removably by means of screws 13 to the end walls 10 of the seed hopper 1 of the planting machine. This disinfectant distributor 12 consists of the magazine 14, which is provided in its bottom portion with the outlet openings 15, and the disinfectant feeding members 16 whose shaft 17 is mounted for rotation in the end walls 18 of the disinfectant magazine 14. In this case, the sprocket 20 provided as a driving means on shaft 17 is coupled by means of chain 21 and sprocket 22 to the drive of the seed feeding mechanism, i.e., notched seed wheels 5, for the purpose of driving the disinfectant feeding means 17 in the direction of arrow 19. The disinfectant feeding means 16 have two plates 23 made of resilient material fastened on opposite sides to shaft 17.

Furthermore, the lower portion of the disinfectant magazine 14 has a rounded cross section, the distance 24 of the shaft 17 from the outlet openings 15 being smaller than the distance 25 to which the plates 23 reach outwardly from shaft 17. In addition, the resilient bristles 26 are fastened to the shaft 17 behind plates 23 in the direction of rotation 19 of the agitator members 16.

In the embodiment represented in FIGS. 3 and 4, the plates 23' of the disinfectant feeding means 16' are divided into the individual paddles 28, 29, in their portion outside of the fastening members 27. In this case, the slits 31 are provided in the individual paddles 29 disposed above the outlet openings 30, for the purpose of intensifying the scraping and loosening action. The outlet openings 30 have a shape that is elongated in the direction of the shaft 17. In the direction of rotation 19 of the disinfectant feeding means 16', the bristles 26 are again located behind the individual paddles 29. Furthermore, the thickness of the wall of the disinfectant magazine diminishes in the area of the outlet openings 30.

In the embodiment represented in FIG. 5, the disinfectant feeding members 32 of the disinfectant distributor 12' consist of the shaft 17, to which the arms 33 are welded above the outlet openings 30, the arms having at their outer extremities the scrapers 34. These scrapers extend at an angle to the longitudinal axis of the shaft 17 above the outlet openings 30, in a manner which is not shown.

The disinfectant distributor 35 represented in FIG. 6 has a magazine 36 in which the outlet openings 37 are formed by the slits 38. These slits 38 are formed during the manufacture of the magazine 36 by offsetting the front wall portion 39 from the rear wall portion 40 at a number of places. The disinfectant feeding means 16' of this disinfectant distributor 35 consist essentially of the shaft 17 and the individual paddles 28, 29, as in the case of the embodiment represented in FIGS. 3 and 4.

In the disinfectant distributor 41 of FIG. 7, in contrast to the distributors described above, the disinfectant magazine 42 is driven in the direction of rotation 19, while the disinfectant feeding means 43, consisting of shaft 17 and the long rubber flaps 44, assume a fixed position in relation to the planting machine. In this arrangement, the magazine 42 of this disinfectant distributor 41 has a circular cross section. In the wall 45 of this magazine 42, the round outlet openings 46 are arranged along the length and around the circumference thereof, being in an offset or staggered relationship to one another longitudinally of the magazine 42, for better disdistribution.

The disinfectant distributor 47 of FIG. 8 is provided with the same magazine 42 as the distributor 41. The difference between two distributors consists essentially in the fact that small spherical bodies 48 are provided within the magazine 42 instead of the disinfectant feeding means 43. These bodies 48 are entrained by the magazine wall 45 as the magazine 42 rotates in the direction of the arrow 19, and roll back in the direction of the arrows 49 and 50, thereby keeping the substance loose and flowing uniformly through the openings.

As best seen in FIG. 1, the agitator fingers 9 of the agitator mechanism 7 are longer than the distance 51 between the agitator shaft 8 and the front wall 52, on the one hand, and the rear wall 53, on the other hand, of the hopper 1.

What is claimed is:

1. Planting machine having a seed planting mechanism and a seed hopper, and serving for the disinfecting of the seed, which is provided in its lower region with outlet openings for the disinfected seed and with a driven agitator mechanism disposed above said outlet openings, which comprises an agitator shaft with agitator means, the planting mechanism as well as also the agitator mechanism being drivable, characterized in that in the hopper for the seed above the agitator mechanism, a disinfectant distributor is arranged which comprises a magazine for receiving a supply of disinfectant, having at least one outlet opening, and of feeding means movable during operation relatively to the magazine to supply the disinfectant to the outlet opening(s) of said magazine and that the disinfectant distributor extends substantially over the entire area of the outlet openings of the seed hopper (1).

2. Planting machine of claim 1, characterized in that the disinfectant distributor is disposed fixedly but removably in the hopper of the machine.

3. Planting machine of claim 2, characterized in that the feeding means of the disinfectant distributor is drivable, and includes a drive member for driving the feeding means, and a driving member for the seed planting mechanism, said drive members being coupled together.

4. Planting machine of claim 3, characterized in that the feeding means of the disinfectant distributor are disposed within the magazine thereof and comprises a shaft and plates of resilient material fastened thereon, that the magazine has a round cross section in its lower area containing a plurality of disinfectant distributor outlet openings and that the distance of the disinfectant distributor outlet openings from the disinfectant distributor shaft is shorter than the length of the plates projecting outwardly from the shaft.

5. Planting machine of claim 4, characterized in that resilient bristles are disposed on the disinfectant distributor shaft behind the plates looking in the direction of rotation of the feeding means, the length of said bristles correspond at least to the distance of the disinfectant distributor outlet openings from the disinfectant distributor shaft.

6. Planting machine of claim 3, characterized in that the wall thickness of the magazine diminishes in the area of the disinfectant distributor outlet openings, from the outside inwardly toward said disinfectant distributor outlet openings.

7. Planting machine of claim 4, characterized in that the wall thickness of the magazine diminishes in the area of the disinfectant distributor outlet openings, from the outside inwardly toward said disinfectant distributor outlet openings.

8. Planting machine of claim 4, characterized in that the plates are divided into individual flaps, the individual flaps extending over the disinfectant distributor outlet openings having slits extending towards disinfectant distributor shaft.

9. Planting machine of claim 4, characterized in that the disinfectant distributor outlet openings have a shape that is elongated in the longitudinal direction of the disinfectant distributor shaft.

10. Planting machine of one of claim 4, characterized in that the disinfectant distributor outlet openings are formed by slits between one wall portion and an offset other wall portion of the magazine.

11. Planting machine of claim 3, characterized in that the disinfectant distributor has a plurality of outlet openings, and feeding means of the disinfectant distributor are provided within the magazine and comprises a disinfectant distributor and arms disposed above the disinfectant distributor outlet openings which are provided with scrapers, that the magazine has a round cross section in its lower portion containing the disinfectant distributor outlet openings, and that the scrapers extend at an angle to the longitudinal axis of the shaft over the disinfectant distributor openings.

12. Planting machine of claim 1, characterized in that the magazine of the disinfectant distributor is equipped with a plurality of outlet openings distributed over its circumference and is driven rotationally, while the feeding means located therein are disposed fixedly relative to the planting machine.

13. Planting machine of claim 1, characterized in that the magazine of the disinfectant distributor has a plurality of outlet openings distributed over its circumference and is driven rotationally, and that a large number of small and solid bodies are provided as feeding means in the magazine, their diameter being greater than the width of the outlet openings.

14. Planting machine of claim 12, characterized in that the outlet openings are disposed offset from one another longitudinally of the magazine.

15. Planting machine of claim 13, characterized in that the outlet openings are disposed offset from one another longitudinally of the magazine.

16. Planting machine of claim 1 characterized in that the agitator means comprises agitating fingers, formed of resilient material.

17. Planting machine of claim 16, characterized in that the agitator fingers are longer than the distance of the agitator shaft from the front and from the rear longitudinal wall of the hopper.

18. Planting machine of claim 5, characterized in that the plates are divided into individual flaps, the individual flaps extending over the disinfectant distributor outlet openings having slits extending towards disinfectant distributor shaft.

19. Planting machine of claim 6, characterized in that the plates are divided into individual flaps, the individual flaps extending over the disinfectant distributor outlet openings having slits extending towards disinfectant distributor shaft.

20. Planting machine of claim 4, characterized in that the disinfectant distributor outlet openings have a shape that is elongated in the longitudinal direction of the disinfectant distributor shaft.

21. Planting machine of claim 5, characterized in that the disinfectant distributor outlet openings have a shape that is elongated in the longitudinal direction of the disinfectant distributor shaft.

22. Planting machine of claim 6, characterized in that the disinfectant distributor outlet openings have a shape that is elongated in the longitudinal direction of the disinfectant distributor shaft.

23. Planting machine of claim 7, characterized in that the disinfectant distributor outlet openings have a shape that is elongated in the longitudinal direction of the disinfectant distributor shaft.

24. Planting machine of claim 8, characterized in that the disinfectant distributor outlet openings have a shape that is elongated in the longitudinal direction of the disinfectant distributor shaft.

* * * * *